Sept. 8, 1964    J. H. BECKMAN    3,147,877
LIQUEFIED GAS CONTAINER

Filed Jan. 9, 1958    2 Sheets-Sheet 1

INVENTOR
JOHN H. BECKMAN
BY
William F. Mesinger
ATTORNEY

Sept. 8, 1964 J. H. BECKMAN 3,147,877
LIQUEFIED GAS CONTAINER
Filed Jan. 9, 1958 2 Sheets-Sheet 2

INVENTOR
JOHN H. BECKMAN
BY
William J. Mesinger
ATTORNEY

United States Patent Office 3,147,877
Patented Sept. 8, 1964

3,147,877
LIQUEFIED GAS CONTAINER
John H. Beckman, Speedway, Ind., assignor to Union
Carbide Corporation, a corporation of New York
Filed Jan. 9, 1958, Ser. No. 707,943
12 Claims. (Cl. 220—9)

This invention relates to an improved method of and apparatus for charging and storing liquefied gases, and more particularly to an improved method and apparatus for charging and storing liquid oxygen in a portable container as part of a system for supplying gaseous oxygen under a suitable temperature and presure to a distributing system or to occupants of an aircraft for breathing purposes.

Customary apparatus for storing liquefied gas generally consists of a heavy pressure vessel surrounded by a thick layer of insulation. In contrast, liquid oxygen storage vessels or "cold converters" for aircraft use have stringent weight requirements. A rule of thumb in the aircraft industry is that each pound of aircraft weight requires an additional 9 pounds of engine, air frame, and fuel to carry it. Since airplanes presently cost about $40 per pound, each pound of weight saved is an eventual saving of $400.

The term "cold converter" as used herein refers to a double-walled, thermally insulated container for receiving and storing low-boiling liquefied gases under pressure in the liquid form for a substantial period, such container having means for discharging the pressurized liquid for use as desired. In the case of aircraft cold converters, the discharged liquid oxygen is vaporized and superheated for high altitude breathing purposes.

Aircraft cold converters generally comprise a double-walled container, with a vacuum insulating jacket between the liquid oxygen containing inner vessel and the outer shell. Such converters are relatively small as compared to industrial size converters, and have a liquefied gas storage capacity of less than 50 liters. The insulating jacket must be provided with a substantially permanent vacuum since no provision is made for re-evacuation of the insulation space. Furthermore, the heretofore proposed aircraft cold converter insulating systems, such as vacuum-polished metal, have required relatively high vacuums to maintain the required insulating efficiency. Consequently it has been necessary to use construction material providing leak tight welds, such as stainless steel and copper. Unfortunately these materials are also relatively heavy, which is a serious drawback for aircraft cold converters, as previously discussed. The prior art has been unable to utilize aluminum, a relatively light material, in such converters because aluminum welds and joints between the aluminum vessels and the connecting tubes of low conductivity metal have a tendency toward porosity and are thus not completely leak-tight.

Prior aircraft cold converters have been filled through the bottom of the inner container by means of the same conduit used for discharging the liquid. It was discovered that this procedure has been the unforeseen cause for a serious limitation on the efficiency of the oxygen supply system; namely, it has been impossible to completely fill the cold converter with liquid oxygen when using standard field filling equipment. This is believed to be caused by the following phenomenon: The liquefied gas, in passing through the long conduits to the cold converter, warms up to about its boiling point and evaporates to a certain extent. The converters are therefore actually being filled with a liquid-gas mixture. Since they are filled from the bottom and vented from the top, the gas passes up through the body of liquid, the volume of gas in the liquid at any instant displacing an equivalent quantity of liquid. Filling was terminated when liquid began to flow out of the vent tube. The contained gas bubbles then escaped out the vent at the top of the container, the liquid level fell in proportion to the volume of the gas bubbles, and the container was hence less than full.

One object of this invention is to provide an improved portable cold converter having the characteristics of light weight, and minimum heat inleak for long liquid oxygen holding periods.

Another object is to provide an improved portable cold converter utilizing lightweight aluminum construction with minimum heat inleak for long liquid oxygen holding periods.

A further object is to provide a method for completely filling a cold converter with liquid oxygen, wherein the oxygen entering the converter is a liquid-gas mixture.

A still further object of the invention is to provide a portable cold converter which can be completely filled with liquid oxygen, even though the filling fluid may be a liquid-gas mixture at the point of entry.

These and other objects and advantages of the invention will become apparent from the following description and the accompanying drawings in which.

In the drawings similar items of apparatus in the several figures are designated by similar reference characters.

Figure 1:
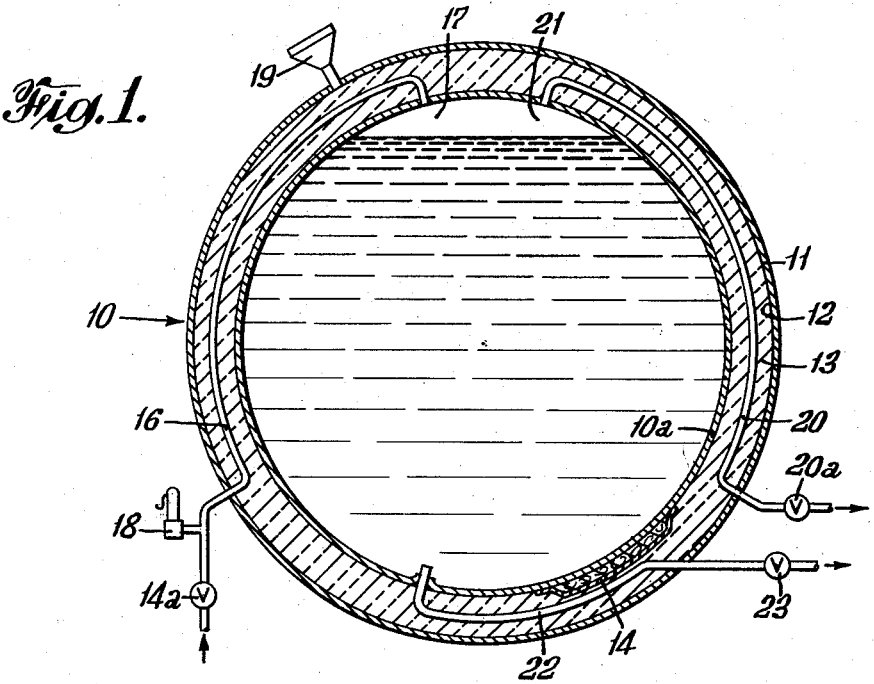
FIGURE 1 is a view, mainly in vertical cross-section, of an exemplary double-walled spherical cold converter construction embodying the principles of the invention.

In accordance with one embodiment of the present invention, a portable cold converter for storing pressurized liquefied gas having a boiling point below 233° K. is provided which comprises an inner vessel for holding a body of the pressurized liquefied gas, an outer aluminum or aluminum alloy shell enclosing and separating the inner vessel from the atmosphere, and a space under a vacuum pressure between the inner vessel and the outer shell. The aforementioned space contains an opacified insulating jacket and gas adsorbent material communicating with the opacified insulation to maintain the space under a vacuum.

The term "vacuum" as used hereinafter is intended to apply to sub-atmospheric pressure conditions not substantially greater than 5,000 microns of mercury, and preferably below 500 microns of mercury absolute.

The term "opacified insulation" as used herein refers to a two component insulating system comprising a low heat conductive, radiation-permeable material and a radiant heat impervious material which is capable of reducing the passage of infra-red radiation rays without significantly increasing the thermal conductivity of the insulating system. Also, the term "radiant heat barrier" as used herein refers to radiation opaque or radiant heat energy impervious materials which reduce the penetration of infra-red heat rays through the insulating system either by radiant heat reflection, radiant heat absorption, or both. As defined, opacified insulation includes a mixture of finely divided low-conductive particles which substantially impede heat inleak by conduction and yield to heat passage by radiation, and finely divided radiant heat impervious bodies having a relatively high thermal conductivity. As more fully described and claimed in U.S. Patent No. 2,967,152, issued in the name of L. C. Matsch and A. W. Francis, the low conductive particles may be selected from the group consisting of silica, perlite, alumina, magnesia, and carbon black, and the radiant heat impervious bodies are preferably either aluminum or copper, although copper paint pigments, alumina paint pigments, magnesium oxide, zinc oxide, iron oxide, titanium dioxide, copper coated mica flakes, carbon black, and graphite either alone or in combination with each other would give satisfactory results. Also, these bodies usually in the form of flakes or powder, preferably constitute between 1% and 80% of the total weight of the insulation.

The opacified insulation may also take the form of the combination of a low heat conductive material and a multiplicity of spaced radiation-impervious barriers. As more fully described and claimed in U.S. Patent No. 3,007,596 issued November 17, 1961 in the name of L. C. Matsch, the low heat conductive material may be the previously listed powderous materials or alternatively a foam or fiber insulation which may be produced in sheet form. Examples of the latter include a filamentary glass material such as glass wool and fiber glass, preferably having fiber diameters up to 50 microns. Also such fibrous materials preferably have a fiber orientation substantially perpendicular to the direction of heat flow across the insulation space. The spaced radiation-impervious barriers may comprise either a metal, metal oxide, or metal coated material, such as aluminum coated plastic film, or other radiation reflective or radiation absorptive material or a suitable combination thereof. Radiation reflective materials comprising thin metal foils are particularly suited in the practice of the present invention, for example, reflective sheets of aluminum foil having a thickness between 0.2 millimeter and 0.002 millimeter. Other radiation reflective materials which are susceptible of use in the practice of the invention are tin, silver, gold, copper, cadmium, or other metals. When foam or fiber sheets are used as the low-conductive material, they may additionally serve as a support means for the relatively fragile radiation-impervious sheets. For example, an aluminum foil-fiber sheet insulation may be spirally wrapped around the inner liquefied gas holding vessel with one end of the insulation wrapping in contact with the inner vessel, and the other end nearest the outer shell, or in actual contact therewith.

It would normally be concluded by one skilled in the art that the aforedescribed opacified insulation could not be economically used in aircraft liquid oxygen cold converters because of the criticality of weight in airplanes and the relatively heavy nature of such insulation. For example, a 50%–50% by weight mixture of silica powder with finely divided copper flakes has a bulk density of about 12 lbs. per cubic ft. It is certainly true that the increased weight due to such powder would be a significant disadvantage in utilizing opacified insulations in prior art aircraft cold converters constructed entirely of relatively heavy materials such as copper or stainless steel. This is because these materials provide relatively leakproof metal joints, and a relatively high vacuum can be maintained in the insulation space, thus affording reasonably high inslulating efficiency with presently available insulating systems.

However, it has been found that opacified insulation in combination with lightweight aluminum or aluminum alloy construction provides an improved aircraft cold converter which is substantially lighter than heretofore used converters having the same storage volume and the same insulating efficiency. For example, a 5-liter aircraft liquid oxygen cold converter built in accordance with the present invention weighs 4 lbs. less than the heretofore used 5-liter converters. This represents a potential saving of about $1600 in airplane cost, as previously discussed. This remarkable result is attainable because the opacified insulations used in this invention have a relatively high insulating efficiency at vacuums poorer in quality than those required for vacuum-polished metal surface insulation.

The terminal insulating effectiveness of opacified insulation versus straight vacuum plus polished surfaces (no powder insulation) can be compared by using the example of two 1-square foot metal plates spaced ⅞-inch apart. When straight vacuum insulation was used, the inside surfaces of the plates were polished to an emmissivity of 0.04. The outer plate was at room temperature (70° F.) and the inner plate was at liquid oxygen temperature (−297° F.). Under 50 microns pressure between the plates, an opacified insulation in this space consisting of 50%–50% by weight mixture of silica powder and finely divided copper metal flakes had a heat transmission of about 1.85 B.t.u./hr. In order for straight vacuum insulation to have a comparable effectiveness, the pressure would have to be less than 0.01 micron. Under similar pressure conditions (50 microns) straight vacuum plus polished surfaces had a considerably higher heat transmission of about 43 B.t.u./hr. It can thus be seen that by using opacified insulation a highly efficient insulating system may be provided in aluminum containing aircraft converters even though the space between the inner vessel and the outer shell is maintained at a relatively poor vacuum because of the porous nature of the aluminum-containing joints. The aluminum components of the present invention may be welded to dissimilar metal members by the method disclosed in U.S. Patent No. 2,914,614, issued in the name of E. V. Yuhasz.

Even though the previously described opacified insulation is more effective than straight vacuum insulation at higher internal pressures (poorer vacuum), its effective thermal insulation life is extended if the pressure can be maintained at or below a desired level. An adsorbent, either in powder or pellet form, is used in the insulation jacket to remove by adsorption the gas entering through the porous aluminum-containing joints. This is extremely important feature since no provision is made in the relatively small aircraft cold converters for re-evacuation of the insulating jacket. The adsorptive capacity of suitable adsorbents, such as natural and synthetic zeolites, silica gel and activated charcoal, generally rises with increased pressure. Therefore these adsorbents are more effective for removal of insulation jacket air leakage when opacified insulation is used than when straight vacuum is employed because of the higher vacuum space pressure involved. Furthermore, these adsorbents generally have higher adsorptive capacities at relatively lower temperatures. Consequently they are preferably mounted adjacent to the cold outer side of the inner vessel wall. Alternatively, the adsorbent may be randomly mixed in the opacified insulation. In particular, zeolitic molecular sieves having pores of at least about 5 Angstrom units in size, as disclosed in U.S. Patent 2,900,800, are preferred as the adsorbent since they have extremely high adsorptive capacity at the temperature and pressure conditions existing in the insulating jacket and are chemically inert toward any gases which might leak into the insulating jacket. Such zeolites may be either natural or synthetic. This novel combination of aluminum construction, opacified insulation and adsorbent thus facilitates construction of a liquefied gas converter for aircraft use which is lighter in weight and has a longer effective life than the previously proposed converters.

In another aspect of the present invention, an aircraft cold converter is provided which can be completely filled with liquefied gas even though the fluid actually entering the cold converter is a liquid-gas mixture. This is accomplished by providing liquid conduit filling means communicating with the top portion of the inner vessel in a first zone adjacent to the liquid level of the filled vessel, and gas conduit venting means communicating with the inner vessel top portion in a second zone horizontally removed from the first zone. The liquid-gas mixture is introduced through the liquid conduit filling means and the gas bubbles from the mixture become separated at the liquid surface within the inner vessel, and are discharged through the gas conduit venting means. By this top filling method, the gas bubbles do not displace liquid in the inner vessel, and the disadvantages of the heretofore proposed methods for filling aircraft cold converters are avoided.

Top filling of liquefied gas cold converters is not a common practice in the industry. This is because top filling requires an additional fluid condiut with its attendant cost, complexity, and heat inleak and is justified only under special conditions. The relatively large and heavy stationary cold converters used, for example, at steel mills are in part refilled through the top of the inner vessel. This is because the incoming liquid is susbtantially subcooled, and such top filled liquid thus serves to condense and conserve the gas in the vapor space of the vessel. For reasons of economy these large storage vessels are not depressurized or "blown down" prior to refilling; consequently the liquid must be pumped or otherwise forced into the vessel against the full operating pressure of such vessel. No vent lines are thus open to the atmosphere during filling operations.

This charging procedure was not used for filling prior art aircraft cold converters for several reasons, the most important being that the filling liquid in the ground servicing vessel is not subcooled to any appreciable extent. This is because subcooling requires heavy and complex subcooling equipment which is undesirable for hand transportation at an airfield or an aircraft carrier deck. Heat transfer to the liquid in the charging conduit results in the converters usually being filled with a saturated liquid at temperatures approaching the boiling point of the liquid at the storage pressure; consequently such incoming liquid is unable to condense vapors. Another reason why the heretofore proposed top filling methods have not been used in conjunction with aircraft cold converters is that such converters are depressurized prior to charging. The vapors thus lost are economically insignificant because of the relatively small size of the converters. Also when the converter is depressurized, it is not necessary to pump the charging liquid into the vessel against contained vapor pressure. Another drawback to top filling aircraft converters is that the vent gases would tend to blow out the incoming substantially saturated liquid-gas mixture, thus providing a vapor-lock at the charging opening. The present invention solves this problem by providing liquid filling and gas venting conduits which communicate with the inner vessel top portion in separate zones which are horizontally removed from each other. For example, this may be accomplished by providing separate openings for the two conduits in the walls of the top portion of the inner vessel. Alternatively, the two conduits could be passed through the inner vessel wall in a concentric manner, one inside the other, and the inner conduit may be provided with a horizontal bend inside the top portion of the inner vessel, so as to provide the necessary horizontal separation. The top filling feature of the present invention thus provides a method of completely filling portable liquefied gas containers, and is particularly suitable for filling aircraft cold converters having a capacity of less than about 50 liters. This is due to the unique problem of charging a liquid-gas mixture into such small vessels.

Referring now more specifically to FIGURE 1, the double walled aircraft cold converter 10 includes a liquid oxygen holding inner vessel 10a which is preferably spherical in form since this shape provides the largest storage volume for a given weight of metal. Inner vessel 10a is preferably fabricated from aluminum or aluminum alloy in order to take advantage of its light weight characteristic. When relatively high internal operating pressures such as 300 p.s.i.g. or higher, are required, the inner vessel may be constructed of heavier but stronger material such as high strength copper, nickel alloys, or stainless steel. It is to be recognized that the liquid holding inner vessel 10a is maintained at very low temperatures when filled, e.g. about −183° C. in the case of oxygen, and consequently the construction material must have high strength characteristics and suitable ductility at such temperatures. The inner vessel 10a is completely surrounded and separated from the atmosphere by an outer aluminum or aluminum alloy shell 11, a space 12 under a vacuum separating the outer wall of the inner vessel from the inner wall of the outer shell 11. Space 12 is filled with the previously described opacified insulation 13 which is preferably a mixture of finely divided low conductive particles and radiant heat impervious bodies having a relatively high thermal conductivity. For example, a 50%–50% by weight mixture of finely divided silica powder having particles sizes below about 75 microns, and copper flakes smaller than about 50 microns with a flake thickness less than 0.5 micron gives best results, although opacified insulation mixtures having larger size particles have been tested with excellent results. It has been found that the powder type opacified insulations are particularly suitable for use with spherical containers because such insulation may be easily poured in the space 12 between the inner vessel 10a and outer casing or shell 11. However, the previously described opacified insulation comprising low heat conductive material and a multiplicity of spaced radiation-impervious barriers could alternatively be used with this container if desired. Blister or perforated container 14 attached to the outer wall of the inner vessel 10a holds a gas-adsorbing material such as a synthetic or natural zeolite to maintain the desired vacuum in space 12.

A substantially saturated liquid-gas mixture at low pressure, e.g. below 20 p.s.i.g., is charged into the inner vessel 10a through regulating valve 14a and liquid filling conduit 16, the latter terminating in the top portion of such vessel in a first zone 17. Pressure relief valve 18 communicates with filling conduit 16 and serves to vent gas in the event of excessive pressure buildup during the liquid oxygen holding period. Also, a safety head 19 is connected to the insulating space 12 to relieve pressure in such space in the event of accidental leakage from the inner vessel. During the charging or filling operation, gas is vented from the top portion of inner vessel 10a through gas conduit 20 which communicates with the top portion in a second zone 21 horizontally removed from the first zone 17 through which the substantially saturated liquid-gaseous oxygen mixture enters. It can thus be seen that the present invention provides a method of and apparatus for completely filling a portable cold converter with a substantially saturated liquid-gas mixture whereby valve 20a in gas conduit 20 is initially opened to depressurize the inner vessel 10a. Next, the liquid-gas mixture is charged into the inner vessel through liquid conduit 16 and the resulting vapor is vented through gas conduit 20. The mixture is charged into the inner vessel until liquid begins to flow out of the gas conduit 20. Liquid oxygen is withdrawn from the inner vessel 10 through conduit 22 communicating with the bottom portion of such vessel and passing through the opacified insulation 13 in space 12 to discharge valve 23 communicating with vaporizing means (not illustrated).

Figure 2:
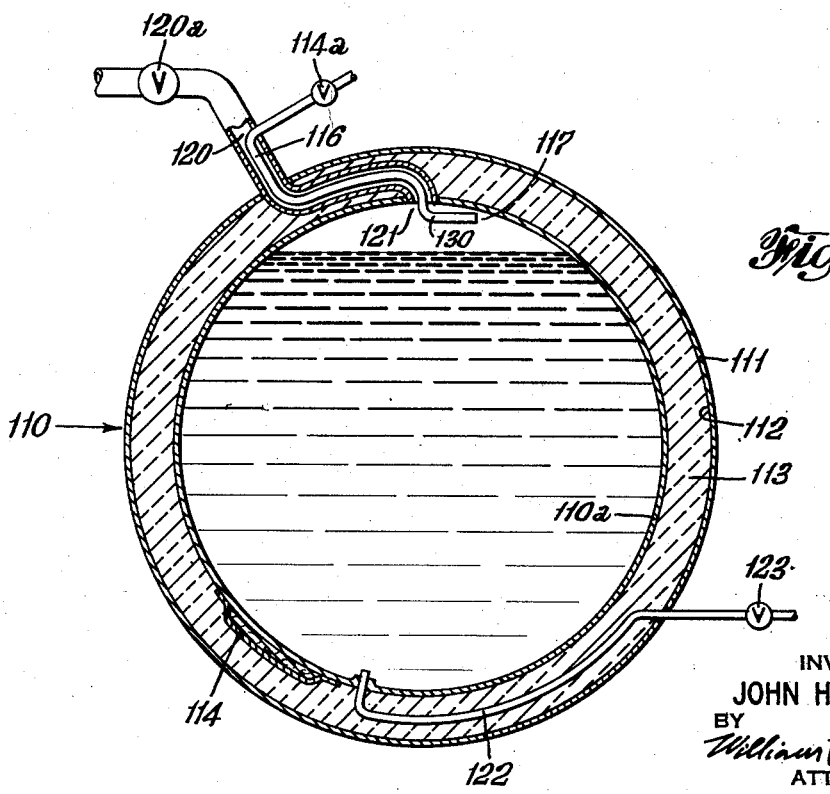
FIGURE 2 is a vertical cross sectional view of a double-walled spherical cold converter construction similar to FIGURE 1, but embodying another form of the invention.

In FIGURE 1, the desired horizontal separation between the liquid filling and gas venting conduits' communications with the inner vessel top portion is obtained by using separate horizontally removed openings for the two conduits in the top portion wall. Alternatively, the two conduits may be concentrically positioned outside of the cold converter, one inside the other, so that the conduits enter the top portion of the inner vessel through the same hole in the wall of such vessel. A bend may be provided in one of the conduits inside the top portion so that the conduits communicate with such top portion in horizontally removed zones. Referring now to FIGURE 2, a spherically shaped cold converter is illustrated which is similar to the converter of FIGURE 1, but differs in certain details in that the liquid filling conduit 116 is concentrically positioned inside the larger gas venting conduit 120 for entrance into the top portion of the inner vessel 110a. The gas conduit 120 communicates with such top portion in zone 121, and to obtain the desired horizontal separation a bend 130 is provided in liquid filling conduit 116 within the top section so that such conduit communicates with the inner vessel top portion in a second zone 117 horizontally removed from the first zone 121 through which the substantially saturated liquid-gaseous oxygen mixture is introduced. In this manner, the cold converter may be simultaneously charged and vented without entrainment of the entering liquid in the vented gas. It is, of course, to be understood that the relative positions of the concentric conduits could be reversed; that is, the gas venting conduit 120 may be positioned inside instead of outside of the liquid charging conduit 116, in which event it would be more convenient to provide the horizontal bend in the gas venting conduit.

Figure 3:
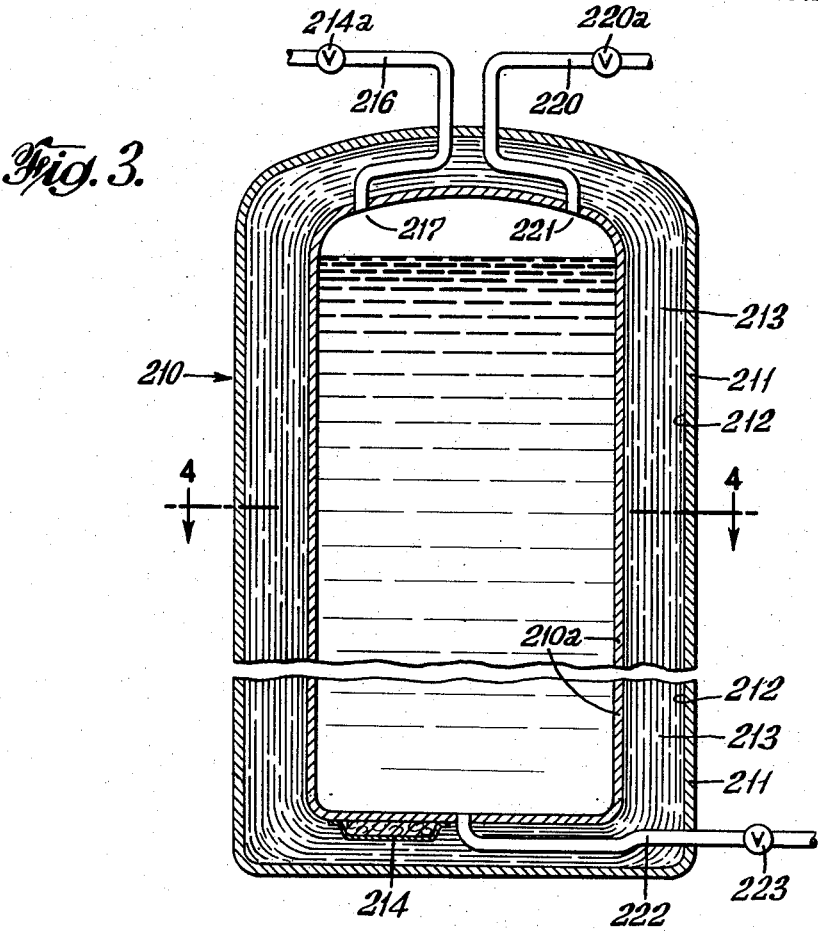
FIGURE 3 is a vertical cross-sectional view of a double-walled cylindrical cold converter construction embodying still another form of the invention.
Figure 4:
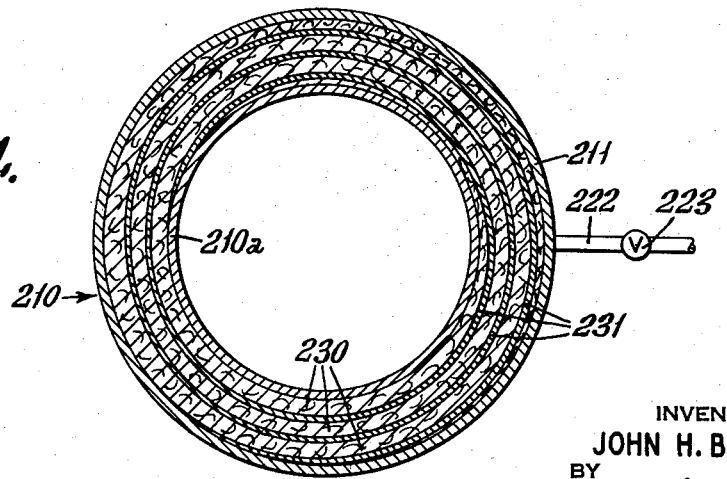
FIGURE 4 is a horizontal cross-sectional view taken along the line 4—4 of FIGURE 3.

Instead of constructing the aircraft cold converter of the present invention in a spherical shape, as illustrated in FIGURES 1 and 2, it may be fabricated in any other desired form, for example, the cylindrical shape of FIGURES 3 and 4. Referring now to these figures, it will be seen that the desired horizontal separation between the liquid filling conduit 216 and the gas venting conduit 220 within the top portion of the inner vessel 210a is obtained by using separate horizontally removed openings for the two conduits in the top portion wall, as was described and illustrated for the FIGURE 1 embodiment of the present invention. It is to be understood, however, that the concentric conduit arrangement of FIGURE 2 may also be used in the cylindrically shaped aircraft cold converter of FIGURE 3.

Although the previously described opacified powder insulation could be used in this converter, an insulating system comprising alternate layers of low conductive fiber sheets and radiation impervious sheets such as aluminum foil may be preferred where the vessel to be insulated is in a cylindrical form. This is because such insulation is easily wrapped or wound around the vessel. As illustrated in FIGURE 4, the opacified insulation comprising low-conductive layers 230 and radiation impervious layers 231 may be spirally wrapped around the inner vessel with one end of the insulation wrapping in contact with the inner vessel 210a and the other end nearest the outer shell 211. Alternatively, the layers may be mounted concentrically with respect to the inner vessel 210a. The tightness and number of wrapping turns is varied to suit the insulating requirements of the particular cold converter. Tightening of the insulation wrapping causes the low conductive and resilient fibrous material to be compressed into a smaller space. This action decreases the percentage voids in the fibrous material, and increases the cross-sectional area of the effective path of solid conduction. However, the voids are reduced in size, which results in the insulation being less sensitive to pressure changes in the vacuum space. On the other hand, wrapping the insulation too loosely decreases the number of turns of radiation shielding in the insulation space, and increases heat leak by radiation. Optimum results are obtained somewhere between these extremes when the sum of the heat leaks due to radiation and conduction is a minimum. By providing a large number of turns of insulation wrappings, the passage of radiative heat is substantially eliminated, while the conductive heat flow along the spiral path is effectively reduced due to the lengthened heat path.

Although preferred embodiments of the invention have been described in detail, it is contemplated that modifications of the apparatus and method may be made and that some features may be employed without others, all within the spirit and scope of the invention.

What is claimed is:

1. A light weight portable container for storing liquefied gas having a boiling point below 233° K., comprising an inner vessel for holding a body of said liquefied gas; an outer shell enclosing and spaced from said vessel defining an insulating space therebetween separating said inner vessel from the atmosphere, said outer shell being selected from materials of the group consisting of aluminum and aluminum alloys; said space being under a vacuum pressure and containing an opacified insulating jacket comprising a multiplicity of low heat conductive-radiation pervious fibrous material layers having fiber diameters less than 50 microns and a multiplicity of radiation-reflective metal foils of less than 0.2 mm. thickness supportably carried by and arranged in alternating sequence with said fibrous material, said metal foils being disposed in parallel spaced relation to each other and said fibrous material having a fiber orientation substantially parallel to the foils and substantially perpendicular to the direction of heat flow across the insulating space; and gas adsorbent material communicating with the opacified insulation to maintain the space under a vacuum.

2. A light weight portable container for storing liquefied gas having a boiling point below 233° K., comprising an inner vessel for holding a body of said liquefied gas; an outer shell enclosing and spaced from said vessel defining an insulating space therebetween separating said inner vessel from the atmosphere, said outer shell being selected from materials of the group consisting of aluminum and aluminum alloys; said space being under a vacuum pressure and containing an opacified insulating jacket comprising a mixture of particles characterized by low thermal conductivity and perviousness to radiation, and radiant heat impervious bodies having a relatively higher thermal conductivity; and gas adsorbent material communicating with the opacified insulation to maintain the space under a vacuum.

3. A portable cold converter for storing pressurized gas having a boiling point below 233° K., comprising an inner vessel for holding a body of said pressurized liquefied gas; an outer shell enclosing and spaced from said vessel defining an insulating space therebetween separating said inner vessel from the atmosphere, said outer shell being selected from materials of the group consisting of aluminum and aluminum alloys; said space being under a vacuum pressure and containing an opacified insulating jacket comprising a multiplicity of low heat conductive fibrous material having diameters less than 50 microns and a multiplicity of radiation-impervious aluminum foils of less than 0.2 mm. thickness supportably carried by and arranged in alternating sequence with said fibrous material, the foils being disposed in parallel spaced relation to each other and the fibrous material having a fiber orientation substantially parallel to the foils and substantially perpendicular to the direction of heat flow across the insulating space; and gas adsorbent material communicating with the opacified insulation to maintain the space under a vacuum.

4. A portable cold converter for storing pressurized gas having a boiling point below 233° K., comprising an inner vessel for holding a body of said pressurized liquefied gas; an outer shell enclosing and spaced from said vessel defining an insulating space therebetween separating said inner vessel from the atmosphere, said outer shell being selected from materials of the group consisting of aluminum and aluminum alloys; said space being under a vacuum pressure and containing an opacified insulating jacket comprising a mixture of low thermal conductive-radiation pervious particles and radiant heat impervious-thermally conductive bodies having a relatively higher thermal conductivity than said particles; and gas adsorbent material communicating with the opacified insulation to maintain the space under a vacuum.

5. A portable cold converter for storing pressurized gas having a boiling point below 233° K., comprising an inner vessel for holding a body of said pressurized liquefied gas; an outer shell enclosing and spaced from said vessel defining an insulating space therebetween separating said inner vessel from the atmosphere, said outer shell being selected from materials of the group consisting of aluminum and aluminum alloys; said space being under a vacuum pressure and containing an opacified insulating jacket comprising a mixture of finely divided low-conductive particles so reduced in size as to substantially impede heat inleak by conduction and yield to the passage therethrough of heat inleak by radiation, and finely divided radiant heat impervious bodies having a relatively higher thermal conductivity than said particles; and gas adsorbent material communicating with the opacified insulation to maintain the insulating space under a vacuum.

6. A portable cold converter according to claim 4 for storing pressurized liquefied gas, in which said low-conductive particles consist of at least one relatively radiant heat transparent material selected from the group consisting of silica, perlite, alumina, magnesia, and carbon black.

7. A portable cold converter according to claim 4 for storing pressurized liquefied gas, in which said radiant heat impervious bodies consist of at least one material selected from the group consisting of aluminum and copper.

8. A portable cold converter according to claim 4 for storing pressurized liquefied gas, in which a mixture of finely divided silica particles and aluminum flakes comprises said opacified insulating jacket.

9. A portable cold converter according to claim 4 for storing pressurized liquefied gas, in which a mixture of finely divided silica particles and copper flakes comprises said opacified insulating jacket.

10. A portable cold converter according to claim 4 for storing pressurized liquefied gas, in which said opacified insulating jacket comprises a mixture of finely divided silica particles and aluminum flakes, said aluminum flakes being present in an amount between 1% and 80% by weight of such insulating jacket.

11. A portable cold converter according to claim 4 for storing pressurized liquefied gas, in which said opacified insulating jacket comprises a mixture of finely divided silica particles and copper flakes, said copper flakes being present in an amount constituting about 50% by weight of such insulating jacket.

12. A portable cold converter according to claim 4 for storing pressurized liquefied gas, in which said opacified insulating jacket comprises a mixture of finely divided silica particles and copper flakes, said copper flakes being present in an amount between 1% and 80% by weight of such insulating jacket.

References Cited in the file of this patent

UNITED STATES PATENTS

| | | |
|---|---|---|
| 662,217 | Brady | Nov. 20, 1900 |
| 1,071,817 | Stanley | Sept. 2, 1913 |
| 1,651,655 | Wright et al. | Dec. 6, 1927 |
| 1,864,606 | McBride | June 28, 1932 |
| 1,970,120 | Badger | Aug. 14, 1934 |
| 2,040,059 | Mesinger | May 5, 1936 |
| 2,042,427 | Kinzel | May 26, 1936 |
| 2,104,548 | Schweller | Jan. 4, 1938 |
| 2,195,077 | Brown | Mar. 26, 1940 |
| 2,329,765 | Jackson et al. | Sept. 21, 1943 |
| 2,381,796 | Williams | Aug. 7, 1945 |
| 2,396,459 | Dana | Mar. 12, 1946 |
| 2,440,738 | Cooper | May 4, 1948 |
| 2,487,863 | Garretson | Nov. 15, 1949 |
| 2,550,040 | Clar | Apr. 24, 1951 |
| 2,677,938 | Loveday | May 11, 1954 |
| 2,776,776 | Strong et al. | Jan. 8, 1957 |
| 2,834,187 | Loveday | May 13, 1958 |
| 2,900,800 | Loveday | Aug. 25, 1959 |
| 2,967,152 | Matsch et al. | Jan. 3, 1961 |

FOREIGN PATENTS

| | | |
|---|---|---|
| 143,219 | Great Britain | Dec. 9, 1920 |
| 683,855 | Great Britain | Dec. 3, 1952 |